(12) United States Patent
Gonzalez Diaz et al.

(10) Patent No.: US 9,996,279 B2
(45) Date of Patent: Jun. 12, 2018

(54) INTEGRITY PROTECTION FOR SYSTEM MANAGEMENT MODE

(71) Applicant: INTEL CORPORATION, Santa Clara, CA (US)

(72) Inventors: Jorge E. Gonzalez Diaz, Tlaquepaque (MX); Juan Manuel Cruz Alcaraz, Zapopan (MX)

(73) Assignee: INTEL CORPORATION, Santa Clara, CA (US)

( * ) Notice: Subject to any disclaimer, the term of this patent is extended or adjusted under 35 U.S.C. 154(b) by 160 days.

(21) Appl. No.: 14/975,576

(22) Filed: Dec. 18, 2015

(65) Prior Publication Data

US 2017/0177245 A1    Jun. 22, 2017

(51) Int. Cl.
| | |
|---|---|
| G06F 3/06 | (2006.01) |
| G06F 12/14 | (2006.01) |
| G06F 13/24 | (2006.01) |
| H04L 9/32 | (2006.01) |

(52) U.S. Cl.
CPC ............ *G06F 3/0619* (2013.01); *G06F 3/065* (2013.01); *G06F 3/0685* (2013.01); *G06F 12/1408* (2013.01); *G06F 13/24* (2013.01); *H04L 9/3234* (2013.01); *H04L 9/3236* (2013.01); *G06F 2212/1052* (2013.01); *G06F 2213/24* (2013.01)

(58) Field of Classification Search
CPC .... G06F 3/0619; H04L 9/3234; H04L 9/3236
See application file for complete search history.

(56) References Cited

U.S. PATENT DOCUMENTS

| | | | |
|---|---|---|---|
| 2006/0047933 A1* | 3/2006 | Morais | G06F 21/57 711/163 |
| 2006/0105739 A1 | 5/2006 | Frank et al. | |
| 2007/0016766 A1* | 1/2007 | Richmond | G06F 21/57 713/100 |
| 2008/0130893 A1 | 6/2008 | Ibrahim et al. | |
| 2011/0078408 A1* | 3/2011 | Ishida | G06F 21/572 711/216 |
| 2012/0297057 A1* | 11/2012 | Ghosh | G06F 21/575 709/224 |

OTHER PUBLICATIONS

International Search Report and Written Opinion received for PCT Patent Application No. PCT/US2016/062953, dated Mar. 10, 2017, 15 pages.
Gulley et al., "Haswell Cryptographic Performance", Intel, White Paper, Jul. 2013, 11 pages.

* cited by examiner

*Primary Examiner* — Farley Abad

(57) ABSTRACT

Various embodiments are directed to providing integrity protection for a system management mode. During initialization, a hash value of a system management mode control routine may be determined. Subsequently, during operation, the hash value may be compared to a hash value of a system management mode control routine to be executed. The system management mode control routine to be executed may be determined to be authentic if the hash values are the same.

26 Claims, 12 Drawing Sheets

SMM IE - 152

| Enable Field 1521 | Size Field 1522 |
|---|---|

INTEGRITY PROTECTION FOR SYSTEM MANAGEMENT MODE

TECHNICAL FIELD

Embodiments described herein generally relate to system management mode (SMM) operations of a computing device.

BACKGROUND

Many computing systems include a mode where instructions may be executed with high privileges. For example, some computer systems include a system management mode (SMM). In SMM, normal execution of instructions, including the operating system, is suspended while special separate instructions (e.g., firmware, etc.) can be executed with high privileges.

An operating system may cause the computer system to enter SMM to manipulate various operational parameters that may not be modifiable during normal operation. For example, the operating system may initiate SMM to overwrite a secure memory location, modify a low level password (e.g. BIOS password, etc.), modify power management functionality, enable or disable security features, manipulate hardware resources, or the like.

Due to the high privileges to which instructions executed during SMM have, SMM may be used to compromise a computer system, for example, as an entry point for a Rootkit, or other malicious software.

DETAILED DESCRIPTION

Figure 1:
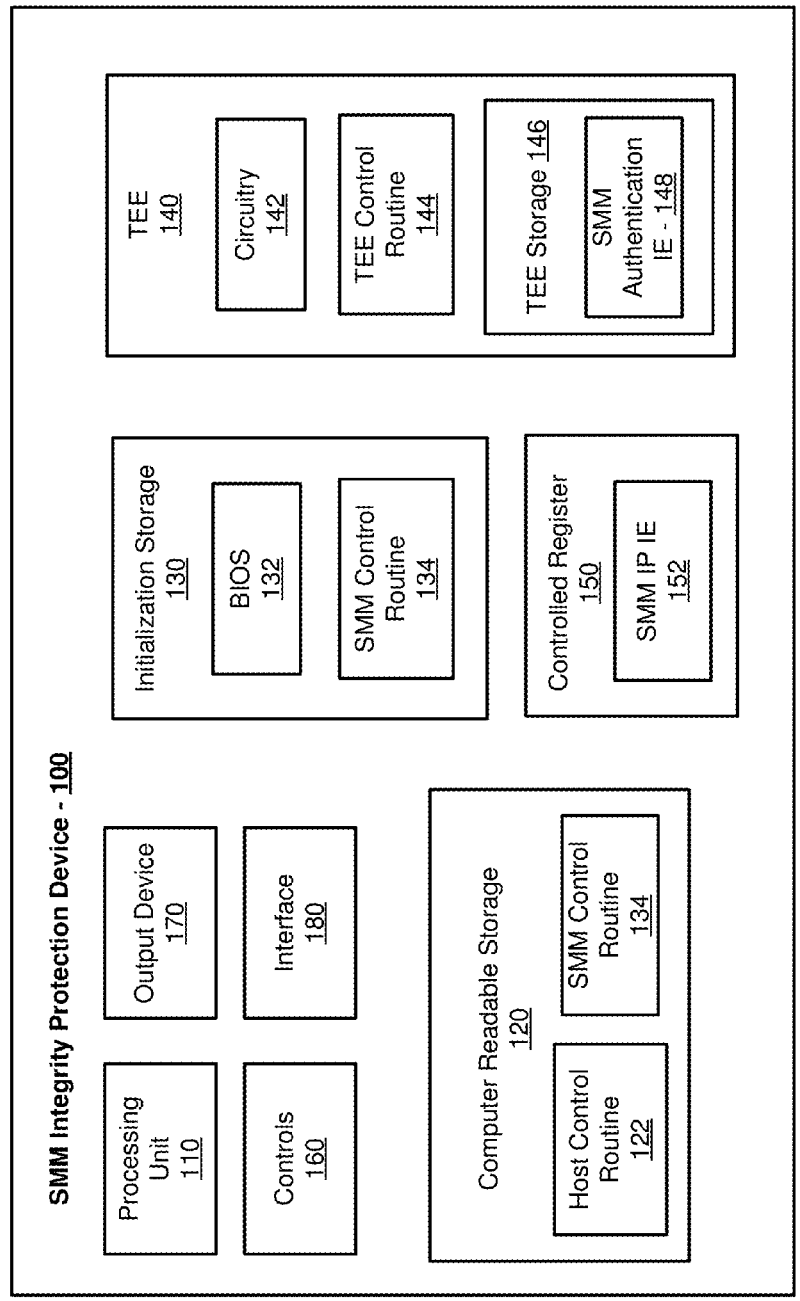
FIG. 1 illustrates a block diagram of a device according to an embodiment.

Various embodiments are generally directed to protecting the integrity of system management mode (SMM). Said differently, the present disclosure is generally directed to ensuring that SMM instructions are authentic. In very general terms, the present disclosure may be implemented by a system to determine a hash value of a system management mode control routine during initialization of the system. Subsequently, during operation of the system, the determined hash value may be compared to a hash value of a system management mode control routine to be executed. The system management mode control routine to be executed may be determined to be authentic if the hash values are the same.

For example, implementations of the present disclosure may identify an alteration to the contents of SMM instructions and restore the SMM instructions in the event an alteration is identified. More specifically, a processing unit may identify alternations to SMM instructions stored in a SMM region of memory by comparing the hash of the contents of the SMM region of memory to a stored hash of authentic SMM instructions. The processing unit, upon a determination that the hashes are the same, may allow the SMM instructions to execute. However, the processing unit, upon a determination that the hashes are different, may restore the SMM instructions, for example, from the BIOS, from firmware, or the like.

It is noted, that the present disclosure refers to a system management mode (SMM). This is not intended to be limiting to specific SMM implementations. For example, the present disclosure may be implemented with any of a variety of secure machine modes, such as, for example, TrustZone® for AMR-LT architectures, SMM for x86 architectures, or the like.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a block diagram of an example device 100 providing SMM integrity protection. The device 100 incorporates one or more of a processing unit 110, a computer-readable storage 120, an initialization storage 140, a trusted execution environment (TEE) 140, a controlled register 150, controls 160, an output device 170, and an interface 180.

The computer-readable storage 120 stores one or more of a host control routine 122 and the SMM control routine 134. It is important to note, that the computer-readable storage 120 is depicted as a single component. However, the storage 120 may be multiple components and/or may include multiple types (e.g., volatile, non-volatile, or the like). The initialization storage 130 stores one or more of a BIOS 132 and the SMM control routine 134. The TEE 140 includes one or more of circuitry 142, a TEE control routine 144, TEE storage 146, which includes an SMM authentication information element (IE) 148. The controlled register 150 stores one or more of an SMM integrity protection (IP) IE 152. It is noted, that the SMM control routine 134 is depicted stored in multiple locations of the device 100. It is to be appreciated, that this is done for convenience and clarity of explanation and that it will be understood that during operation, the SMM control routine 134 may be copied and/or moved to different locations (e.g., memory storage location, or the like) of the device 100.

In general, the device 100 is configured to provide integrity protection for a system management mode, such as, for example, the SMM control routine 132. The SMM integrity protection may be best explained by describing an initialization of SMM integrity protection and operation of SMM integrity protection. Accordingly, an initialization of SMM integrity protection is described first followed by a description of SMM integrity protection operation.

SMM Integrity Protection Initialization

Upon initialization of the device 100, for example, upon initialization from a cold-boot, or the like, the processing unit 110 may execute the BIOS 132 to initialize the device 100. In some examples, the BIOS 132 is referred to as an "initialization control routine" as the BIOS 132 may be executed, for example, by the processing unit 110, to initialize the device 100. The processing unit 110, in executing the BIOS 132 may copy the SMM control routine 134 from the initialization storage 130 to the computer-readable storage 120. For example, in some implementations, the initialization storage 130 may be serial peripheral interface (SPI) flash memory component while the computer-readable storage 120 is a dynamic random access memory (DRAM) memory component. Accordingly, the BIOS 132 may copy the SMM control routine 134 from SPI to DRAM.

In some implementations, the processing unit 110, in executing the BIOS 132 may enable SMM integrity protection, by for example, setting a bit of the SMM IP IE 152 in the controlled register 150 to indicate that SMM integrity protection is enabled. Accordingly, during initialization of the device 100, the BIOS 132 may enable (or disable) SMM integrity protection. For example, the BIOS 132 may have a setting (e.g., set by an OEM, or the like) to enable or disable SMM integrity protection. Accordingly, the processing unit 110 may set a bit within the SMM IP IE 152 to indicate that SMM integrity protection is enabled or disabled. It is noted, that this may provide flexibility to manufacturers, integrators, OEMs, or the like to implement the present disclosure.

The processing unit 110, in executing the BIOS 132 may provide an indication of the size of the SMM control routine 134. For example, the processing unit 110, in executing the BIOS 132 may add an indication of the size (e.g., in bits, in bytes, based on memory addresses, or the like) of the SMM control routine 134 to the SMM IP IE 152. Additionally, the BIOS 132 may trigger a first system management mode interrupt (SMMI). For example, the processing unit 110, in executing the BIOS 132, may add an instruction to be executed upon issuance of an SMMI at a particular memory location. This is explained in greater detail below. However, generally with some implementations, the processing unit 110, in executing the BIOS 132 may place an instruction at the address 0x38000 and then issue the SMMI.

The circuitry 142, in executing the TEE control routine 144 may capture the SMMI. In particular, the circuitry 142 may be configured to capture SMMIs triggered within the device 100. This is explained in greater detail below. The circuitry 142, in executing the TEE control routine 144 may capture the SMMI and may determine whether SMM integrity protection is enabled or not. For example, the circuitry 142, in executing the TEE control routine 144 may determine whether SMM integrity protection is enabled based on an indication I the SMM IP IE 152.

The circuitry 142, in executing the TEE control routine 144 may determine an indication of the SMM control routine 134 based on a determination that SMM integrity protection is enabled. In some implementations, the circuitry 142 may determine a hash value corresponding to the SMM control routine 134. In general, the circuitry 142, in executing the TEE 144 may determine any of a variety of hashes from the SMM control routine 134. For example, the circuitry 142 may derive a checksum hash, a cyclic redundancy hash, a universal hash, an unkeyed cryptographic hash (e.g., RIPEMD, SHA, or the like, etc. Examples, however, are not limited in this context. The circuitry 142, in executing the TEE control routine 144 may generate the SMM Authentication IE 148 to include the indication of the determined hash and add the IE 148 to the TEE storage 146. It is noted, that the TEE storage 146, may be a "protected storage" component. More specifically, the TEE storage 146 may be secured and/or protected from access by other components of the device 100.

SMM Integrity Protection Operation

The processing unit 110, in executing the host control routine 122 may generate and/or receive an SMMI. For example, during operation of the device 100, the host control routine 122 (e.g., operating system, or the like) may receive an indication to enter an SMM mode (e.g., may receive an SMMI, or the like). The processing unit 110, in executing the host control routine 122 save a micro-architectural state of the processor unit 110, the storage 120, the device 100, or the like.

The circuitry 142, in executing the TEE control routine 144 may capture the SMMI and may determine whether SMM integrity protection is enabled or not. For example, the circuitry 142, in executing the TEE control routine 144 may determine whether SMM integrity protection is enabled based on an indication of the same in the SMM IP IE 152. The circuitry 142, in executing the TEE control routine 144 may determine an indication of the SMM control routine 134 in computer-readable storage 120. For example, the circuitry 142, in executing the TEE control routine 144 may derive a hash value of the SMM control routine 134 to be executed in the SMM mode (e.g., the SMM control routine in DRAM, in a cache of the processing unit 110, or the like).

The circuitry 142, in executing the TEE control routine 144, may determine whether the determined hash of the SMM control routine 134 equals the hash of the SMM control routine 134 indicated by the SMM Authentication IE 148. More specifically, the TEE control routine 144 may compare the hash of the SMM control routine 134 to be executed during an SMM mode and the hash of the SMM control routine 134 derived at initialization of the device 100. The circuitry 142, in executing the TEE control routine 144 may reload the SMM control routine 134 (e.g., from initialization storage 130, or the like) based on a determination that the hash values do not match. It is to be appreciated that some vectors of attack may attempt to corrupt or replace SMM control routines storage in DRAM prior to initialization of an SMM control routine. Said differently, the circuitry 142, in executing the TEE control routine 144 may restore the SMM control routine 134 form a "master copy" of the SMM control routine, such as, for example, as stored in an SPI flash (e.g., initialization storage 130, or the like). Accordingly, the present disclosure may provide for correction and/or detection of SMM control routines 134 manipulated and/or modified after initialization by the BIOS 132 and before execution in an SMM mode.

The device 100 may be any of a variety of types of computing devices, including without limitation, a server, a desktop computer, a workstation computer, a laptop computer, a netbook computer, an ultrabook computer, a tablet computer, a handheld personal data assistant, a smartphone, a body-worn computing device (e.g., incorporated into clothing,) a media streaming device, an audio computing device, a video computing device, a smart television, or the like. It is important to note, that the components of the device 100 may be implemented within the same housing and/or within separate housings.

In various embodiments, the processing unit 110 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments the processing unit 110 may include a trusted execution environment (e.g., Intel CSE®, Intel ME®, Intel VT®, Intel SGX®, ARM Trusted-Zone®, or the like) to provide for the processing and/or storing of sensitive information. As a specific example, the processor element 120 may comprise the TEE 140.

In various embodiments, the computer-readable storage 120, the initialization storage 130, the controlled register 150, and/or the TEE storage 146 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In general, the initialization storage 130 may be accessible only during an initialization of the device 100, such as, for example, by the BIOS 132, or the like. Additionally, the controlled register may be a register accessible by the BIOS 132 and/or the TEE 140. With some examples, the controlled register may be successfully written to once every time the device 100 is initialized.

In various embodiments, the TEE 140 may comprise logic, functions, features, and/or storage to securely implement the functions described herein. It is important to note, as stated above, the TEE 140 may be incorporated into the processing unit 110. However, for purposes of clarity, the TEE 140 is depicted separate from the processing unit 110. In some examples, the TEE 140 may be implemented as a secure enclave, a secure co-processor, or the like.

In various embodiments, the controls 160 may be any of a variety controls for the device 100, such as, for example, keyboard, mouse, trackpad, touch input device, or the like. In various embodiments, the output device 170 may be any of a variety of output devices, such as, for example, a display, light emitting diodes (LEDs), a speaker, or the like. In various embodiments, the interface 180 may employ any of a wide variety of signaling technologies enabling the components to be coupled through a network.

Figure 2:
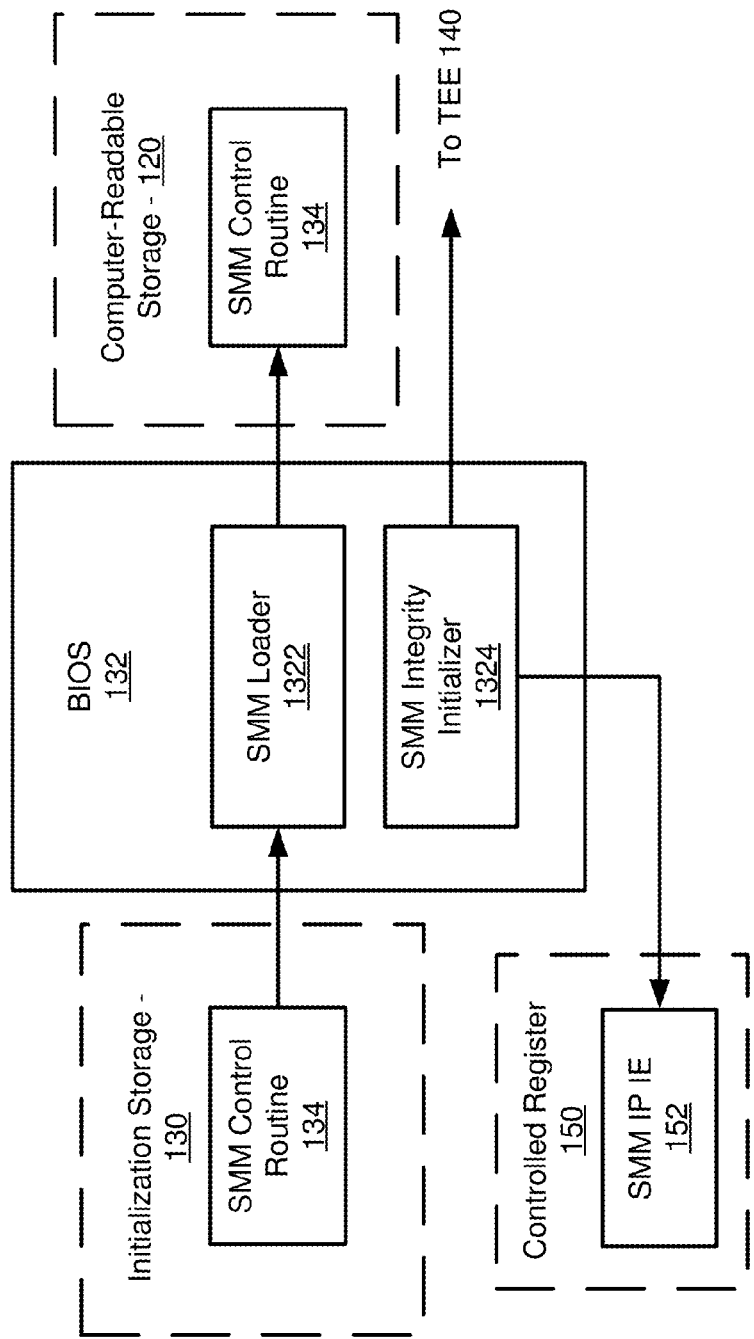
FIGS. 2-4 each illustrate a block diagram of aspects of the operation of the device of FIG. 1 according to various embodiments.
Figure 3:
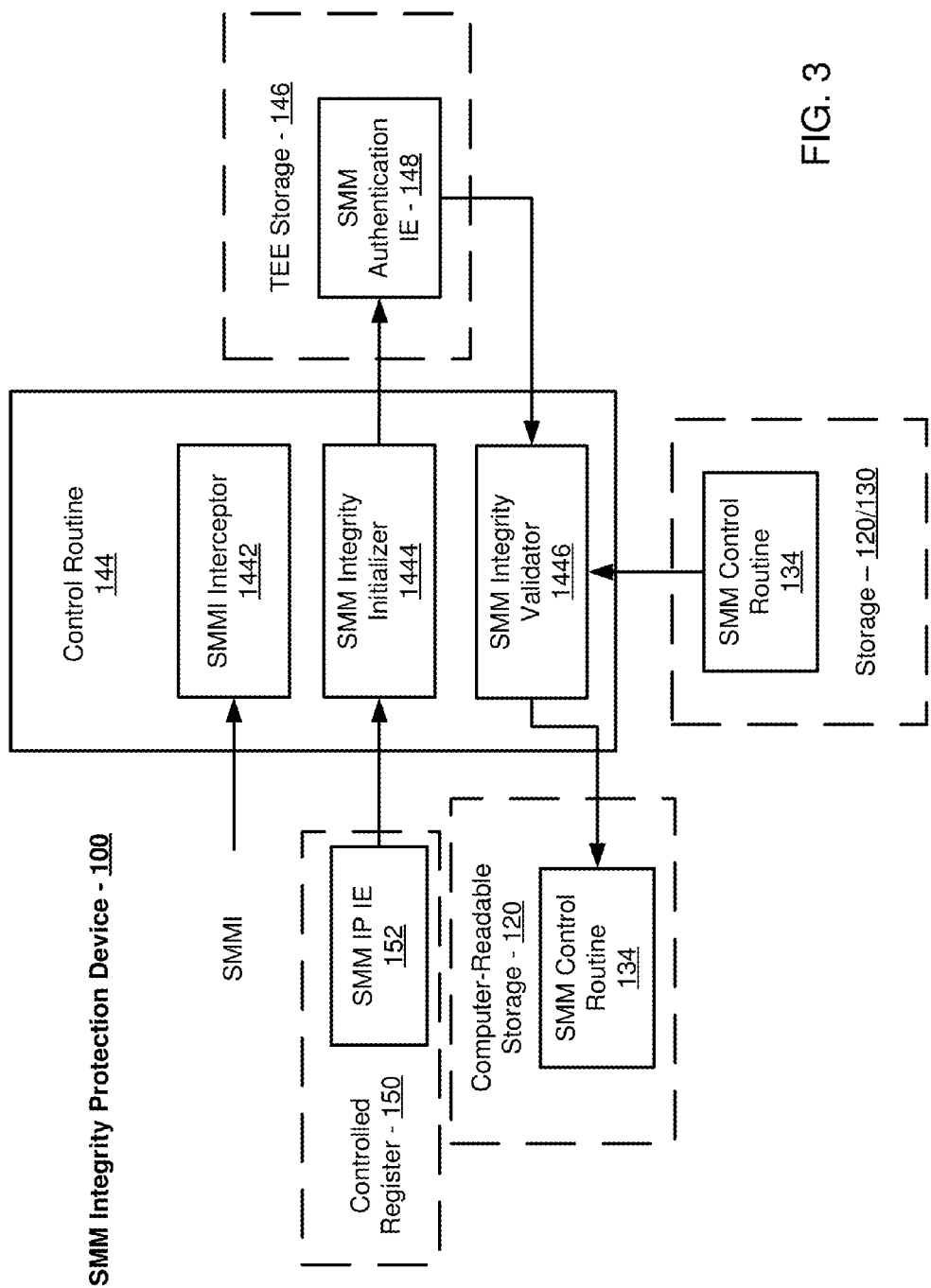
Figure 4:
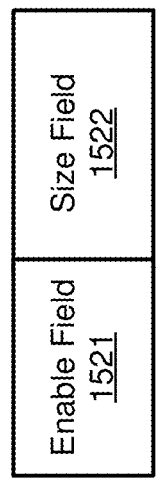

FIGS. 2-4 are block diagrams illustrating example aspects of the device 100 of FIG. 1. In particular, FIG. 2 illustrates a block diagram of aspects of the BIOS 132; FIG. 3 illustrates a block diagram of aspects of the TEE control routine 144; and FIG. 4 illustrates a block diagram of an example SMM IE 152. These figures are described in conjunction with each other for convenience and clarity. However, examples are not limited in this context.

Turning more specifically to FIG. 2, the BIOS 132 may include one or more of device drivers and/or application-level routines (e.g., so-called "software suites" provided on media, "firmware", etc.). Where one or more device drivers are included, those device drivers may provide support for any of a variety of other components, whether hardware or software components, of the device 100. The BIOS 132 may comprise an SMM loader 1322 and an SMM integrity initializer 1324.

With some examples, the SMM loader 1322 copies the SMM control routine 134 from the initialization storage 130 to the computer-readable storage 120. For example, during initialization of the device 100, the processing unit 110 may execute the BIOS 132 to initialize the device 100. During such initialization, the BIOS 132 may copy the SMM control routine 134 from storage 130 (e.g., SPI flash, or the like) to storage 120 (e.g., DRAM, or the like).

With some examples, the SMM integrity initializer 1324 may enable or disable SMM integrity protection. For example, the SMM integrity initializer 1324 may set a bit within the SMM IP IE 152 to indicate that SMM integrity protection is enabled or disabled. More specifically, as depicted in FIG. 4, the SMM IP IE 152 may include an enable field 1521. The enable field 1521 may be set to indicate that SMM integrity protection is enabled or disabled. For example, the enable field 1521 may be a bit within the SMM IP IE 152 that can be set (e.g., 0, 1, or the like) to indicate whether SMM integrity protection is enabled or disabled for the device 100. As a specific example, non limiting example, the SMM integrity initializer 1324 may set the enable field 1521 to logic "1" to indicate that SMM integrity protection is enabled, or to logic "0" to indicate that SMM integrity protection is disabled.

With some examples, the SMM integrity initializer 1324 may add an indication of the size of the SMM control routine 134 to the SMM IP IE 152. For example, as depicted in FIG. 4, the SMM IP IE 152 may include a size field 1522 that can be set to indicate a size of the SMM control routine 134. For example, the SMM integrity initializer 1324 may set the size field to include an indication of the size (e.g., in bits, in bytes, in hex, or the like) of the SMM control routine 134.

The SMM integrity initializer 1324 may add the SMM IP IE 152 to the controlled register 150. As noted above, the controlled register 150 may be a write once per boot, or the like register.

Turning more specifically to FIG. 3, the TEE control routine 144 may include one or more of device drivers and/or application-level routines (e.g., so-called "software suites" provided on media, "firmware", etc.). Where one or more device drivers are included, those device drivers may provide support for any of a variety of other components, whether hardware or software components, of the TEE 140. The TEE control routine 144 may comprise an SMMI interceptor 1442, an SMM integrity initializer 1444, and an SMM integrity validator 1446.

With some examples, the SMMI interceptor 1442 may intercept SMMIs generated during operation of the device 100. For example, during initialization of the device 100, the BIOS 132 may generate an SMMI as described above. As another example, during operation of the device 100, the processing unit 110, in executing the host control routine 122, may generate an SMMI to enter an SMM mode. The SMMI interceptor 1442 may intercept these SMMI prior to entering SMM.

SMM Integrity Protection Initialization

With some examples, the SMM integrity initializer 1444 may access the SMM IP IE 152 from the controlled register 150 based on intercepting an SMMI. More particularly, as described above, the BIOS 132 may place an instruction in memory (e.g., at 0x38000, or the like) to cause the TEE 140 to initialize SMM integrity protection as described herein.

The SMM integrity initializer 1444 may execute the instruction to retrieve the SMM IP IE 152. The SMM integrity initializer 1444 may determine whether SMM integrity protection is enabled or not. For example, the SMM integrity initializer 1444 may determine whether the enable field 1521 indicates SMM integrity protection is enabled or not.

The SMM integrity initializer 1444 may generate an indication (e.g. hash, or the like) of the SMM control routine and add the indication of the SMM control routine 134 to the SMM authentication IE 148 based on a determination that SMM integrity protection is enabled. For example, the SMM integrity initializer 1444 may determine a hash (e.g., SHA-256, or the like) of the SMM control routine 134 and add the hash to the SMM authentication IE 148. The SMM integrity initializer 1444 may add the SMM authentication IE 148 to the TEE storage 146.

SMM Integrity Protection Operation

In general, the SMM integrity validator 1446 may validate the SMM control routine 134 based on intercepting an SMMI during operation of the device 100. More specifically, during operation of the device 100, the SMMI interceptor 1442 may intercept an SMMI and the SMM integrity validator 1446 may determine whether SMM integrity protection is enabled and may validate the SMM control routine 134 prior to entering the SMM mode. Said differently, the SMM integrity validator 1446 may determine whether SMM integrity protection is enabled and may validate the SMM control routine 134 prior to the processing unit 110 executing the SMM control routine 134.

With some examples, the SMM integrity validator 1446 may determine whether SMM integrity protection is enabled based on the enable field 1521 in the SMM IP IE 152 stored in the controlled register 150. With some examples, the SMM integrity validator 1446 may determine (e.g., derive, calculate, or the like) an indication of the SMM control routine 134 stored in computer-readable storage 120 and compare the determined indication to the indication of the SMM control routine 134 in the SMM authentication IE 148. For example, the SMM integrity validator 1446 may determine a hash of the SMM control routine 134 stored in computer-readable storage 120 and compare the determined hash to the hash in the SMM authentication IE 148 stored in TEE storage 146.

With some examples, the SMM integrity validator 1446 may initiate the SMM mode (e.g., initiate execution of the SMM control routine 134, allow the SMMI interrupt to be handled conventionally, or the like) based on a determination that the SMM control routine 134 is authentic. More specifically, the SMM integrity validator 1446 may execute the instructions and 0x38000, or the like.

With some examples, the SMM integrity validator 1446 may reload the SMM control routine 134 from the initialization storage 130 based on a determination that the SMM control routine 134 is not authentic. More particularly, the SMM integrity validator 1446 may reload the SMM control routine 134 (e.g., by copying it to DRAM, or the like). With some examples, the SMM integrity validator 1446 may force a restart of the device 100 based on a determination that the SMM control routine 134 is not authentic. With some examples, the SMM integrity validator 1446 may execute the SMM control routine 134 from the initialization storage 130 based on a determination that the SMM control routine 134 in storage 120 is not authentic.

Turning more particularly to FIG. 4, a block diagram of the SMM IP IE 152 is depicted. As depicted, the SMM IP IE 152 may include fields, for example, the enable field 1521 and the size field 1522. It is noted, that the SMM IP IE 152 may be any of a variety of information elements and the fields may be contiguous or not contiguous within the information element. It is further noted, that in some examples, the SMM control routine 134 may be less than 10 kilobytes. As such, the SMM IP IE 152 may be 24 bits. Furthermore, the controlled register 150 may be 24 bits. Examples are not limited in this context.

Figure 5:
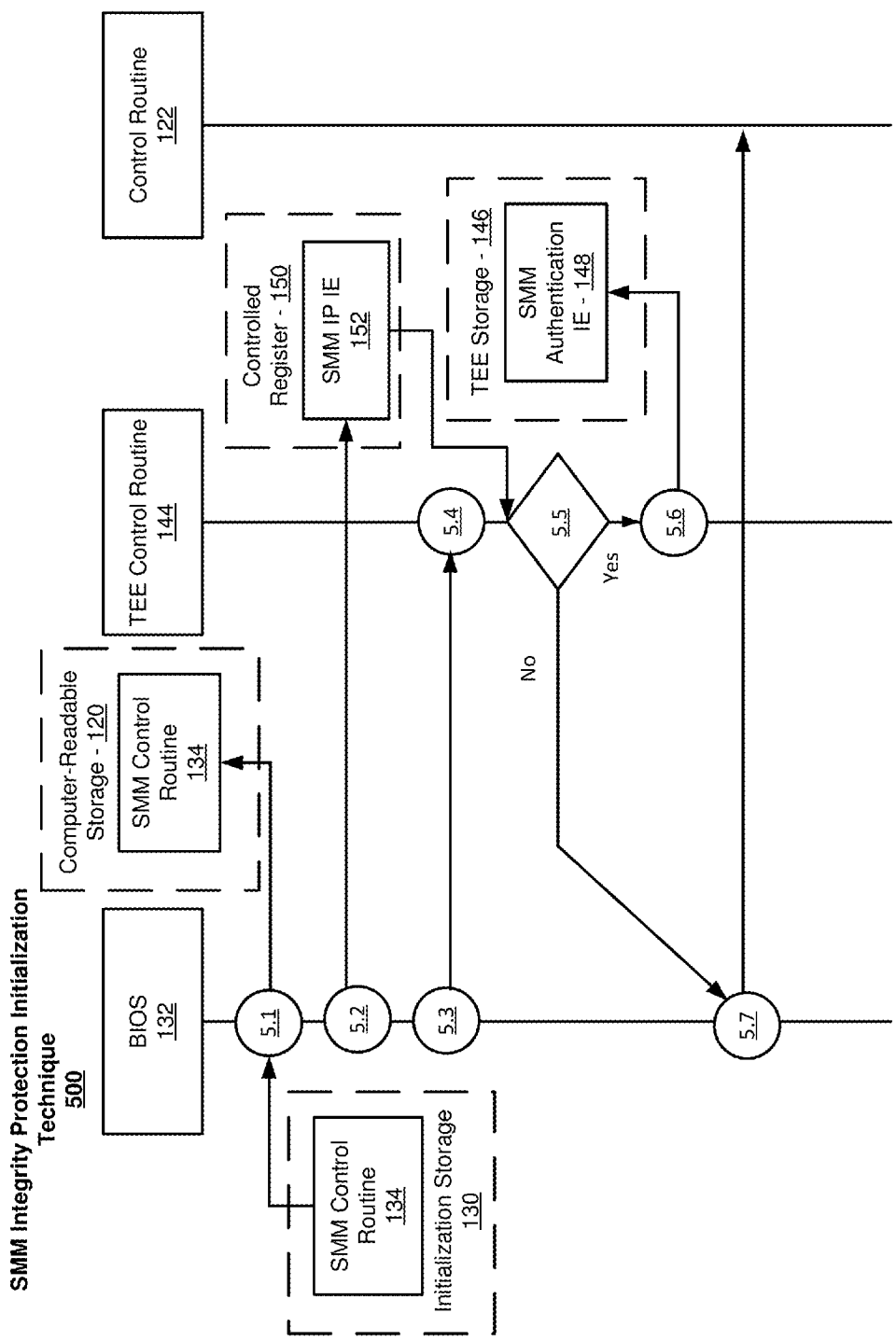
FIGS. 5-6 each illustrate block diagrams of techniques according to various examples.
Figure 6:
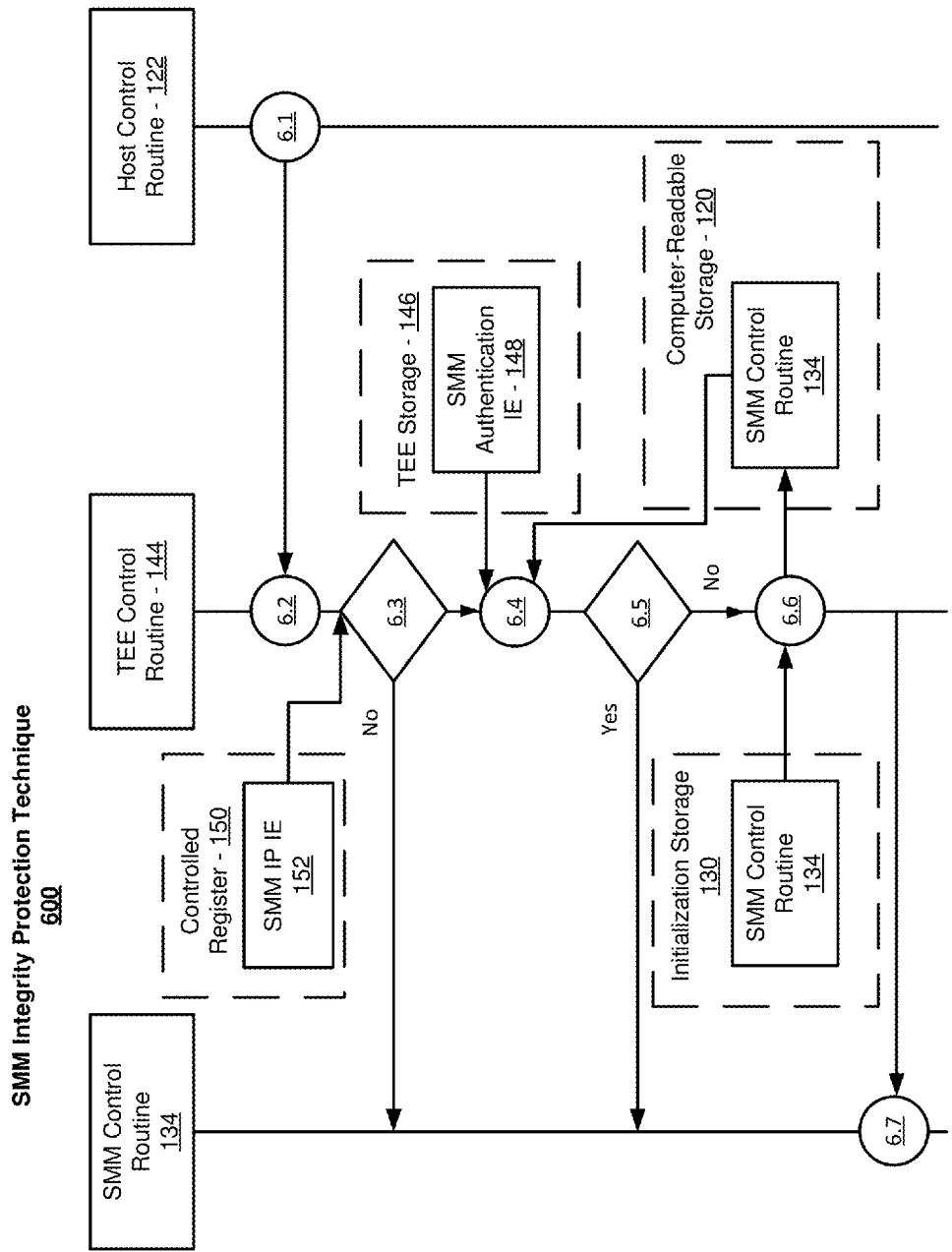

FIGS. 5-6 depict techniques that may be implemented by a device according to the present disclosure. For example, these figures depict example techniques that may be implemented by the device 100 of FIG. 1. In particular, FIG. 5 illustrates an example technique 500 for initializing an SMM integrity protection; while FIG. 6 illustrates an example technique 600 for SMM integrity protection operation. Said differently, the device 100 may implement the technique 500 during initialization (e.g., upon cold-boot, or the like) while the device 100 may implement the technique 600 during operation (e.g., when entering an SMM mode, or the like). The techniques 500 and 600 are described with reference to the device 100 and FIGS. 1-4. However, examples are not limited in this context.

Turning more particularly to FIG. 5, the technique 500 may begin at block 5.1. At block 5.1, the BIOS 132 copies the SMM control routine 134 from initialization storage 130 to computer-readable storage 120. For example, the BIOS 132 can copy the SMM control routine 134 from SPI flash to DRAM, or the like. Continuing to block 5.2, the BIOS 132 may enable SMM integrity protection. For example, the BIOS 132 may generate the SMM IP IE 152 to include an indication (e.g., the enable field 1521, or the like) as to whether SMM integrity protection is enabled and an indication of the size of the SMM control routine 134. Additionally, at block 5.2, the BIOS 132 may add the SMM IP IE 152 to the controlled register 150.

Continuing to block 5.3, the BIOS 132 may generate an SMMI to be intercepted by the TEE control routine 144. At block 5.4, the TEE control routine 144 may intercept the SMMI generated by the BIOS 132 at block 5.3.

Continuing to block 5.5, the TEE control routine 144 may determine whether SMM integrity protection is enabled or not. For example, the TEE control routine 144 may determine whether SMM integrity protection is enabled based on the enable field 1521 in the SMM IP IE 152. From block 5.5, the technique 500 may continue to either block 5.6 or block 5.7, For example, the technique 500 may continue to block 5.6 based on a determination that SMM integrity protection is enabled while the technique 500 may continue to block 5.7 based on a determination that SMM integrity protection is not enabled.

At block 5.6, the TEE control routine may determine an indication (e.g., hash value, or the like) of the SMM control routine 134 and add the indication to the TEE storage 146. For example, the circuitry 142, in executing the TEE control routine 144 may generate the SMM authentication IE 148 and add the SMM authentication IE 148 to the TEE storage 146.

Turning more particularly to FIG. 6, the technique 600 may begin at block 6.1. At block 6.1, the host control routine 122 may generate an SMMI to include an indication for the device 100 to enter an SMM mode. Continuing to block 6.2, the TEE control routine 144 may intercept the SMMI. Continuing to block 6.3, the TEE control routine 144 may determine whether SMM integrity protection is enabled or not. For example, the TEE control routine 144 may determine whether SMM integrity protection is enabled based on the enable field 1521 in the SMM IP IE 152. From block 6.3, the technique 600 may continue to either block 6.4 or block 6.7, For example, the technique 600 may continue to block 6.4 based on a determination that SMM integrity protection is enabled while the technique 600 may continue to block 6.7 based on a determination that SMM integrity protection is not enabled.

At block 6.4, the TEE control routine 144 may determine an indication of the SMM control routine 134 to be executed (e.g., the SMM control routine 134 in computer-readable storage 120, in a cache of the processing unit 110, or the like). Additionally, at block 6.4, the TEE control routine 144 may determine an indication of the authentic SMM control routine 134 (e.g., the control routine loaded at system initialization, or the like). For example, the TEE control routine 144 may determine a hash of the SMM control routine 134 to be executed and a hash of the SMM control routine 134 indicated in the SMM authentication IE 148 stored in TEE storage 146.

Continuing to block 6.5, the TEE control routine 144 may determine whether the SMM control routine 134 is authentic. For example, the TEE control routine 144 may compare the hash of the SMM control routine 134 to be executed to the hash indicated by the SMM authentication IE 148. From block 6.5, the technique 600 may continue to either block 6.6 or block 6.7, For example, the technique 600 may continue to block 6.6 based on a determination that SMM control routine 134 is not authentic while the technique 600 may continue to block 6.7 based on a determination that SMM control routine 134 is authentic. More particularly, the technique 600 may continue from block 6.5 to block 6.7 if the determined hash values are equal and may continue from block 6.5 to block 6.6 if the determined hash values are not equal.

At block 6.6, the TEE control routine 144 may reload the SMM control routine 134. For example, the TEE 144 may copy the control routine 134 from initialization storage 130 to storage 120. At block 6.7, the SMM control routine 134 may be executed.

Figure 7:
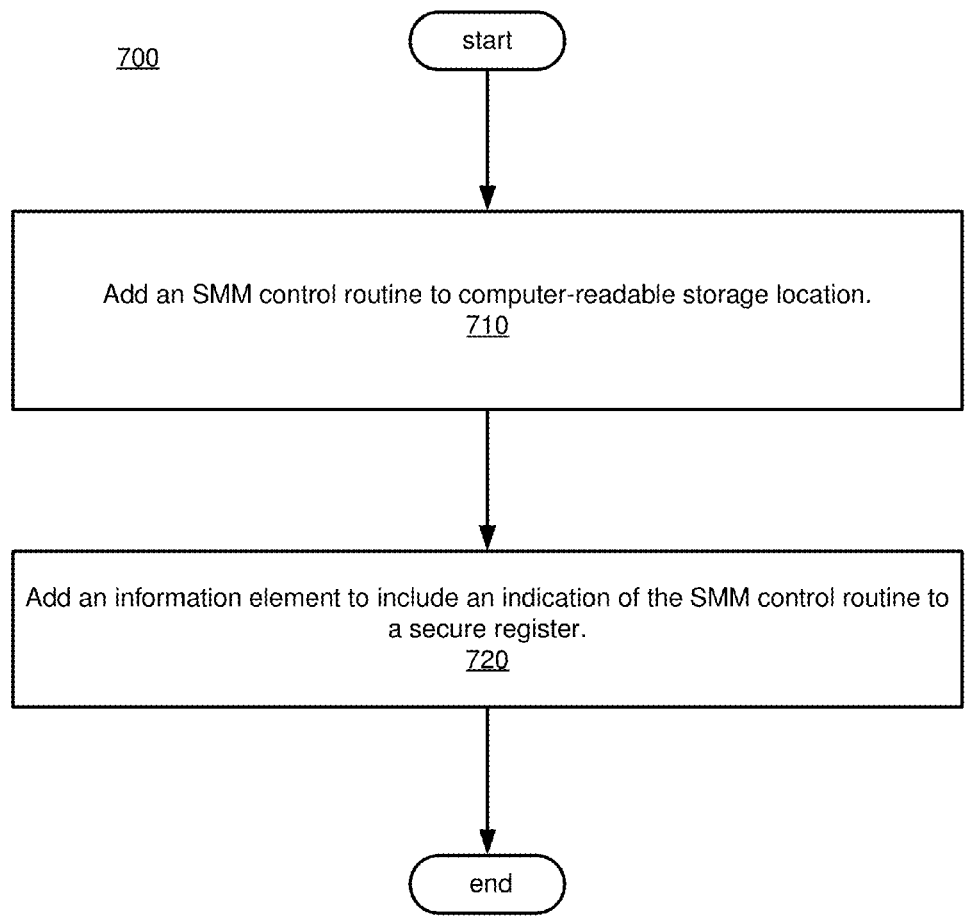
FIGS. 7-10 each illustrate logic flows according to various examples.
Figure 8:
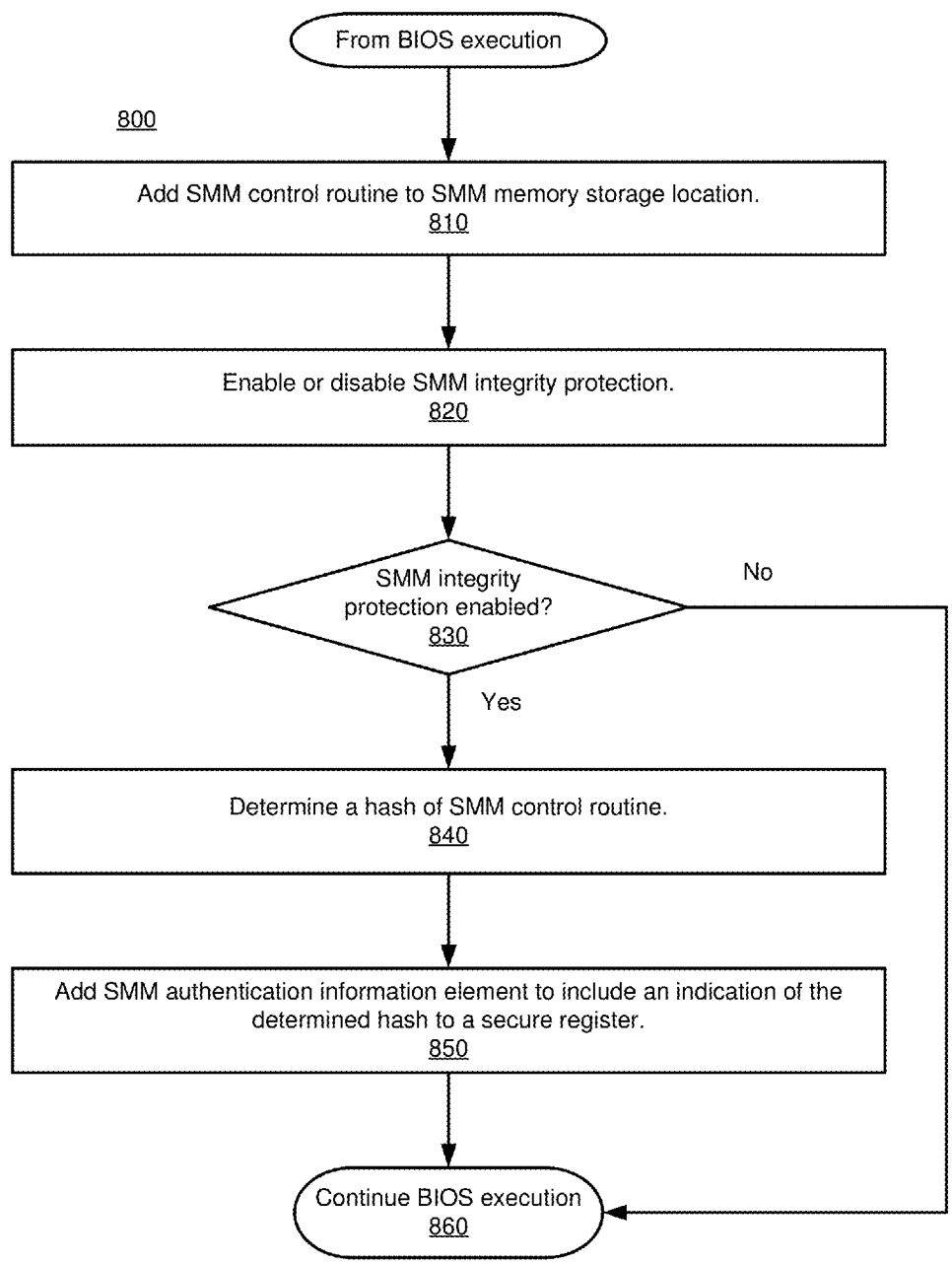
Figure 9:
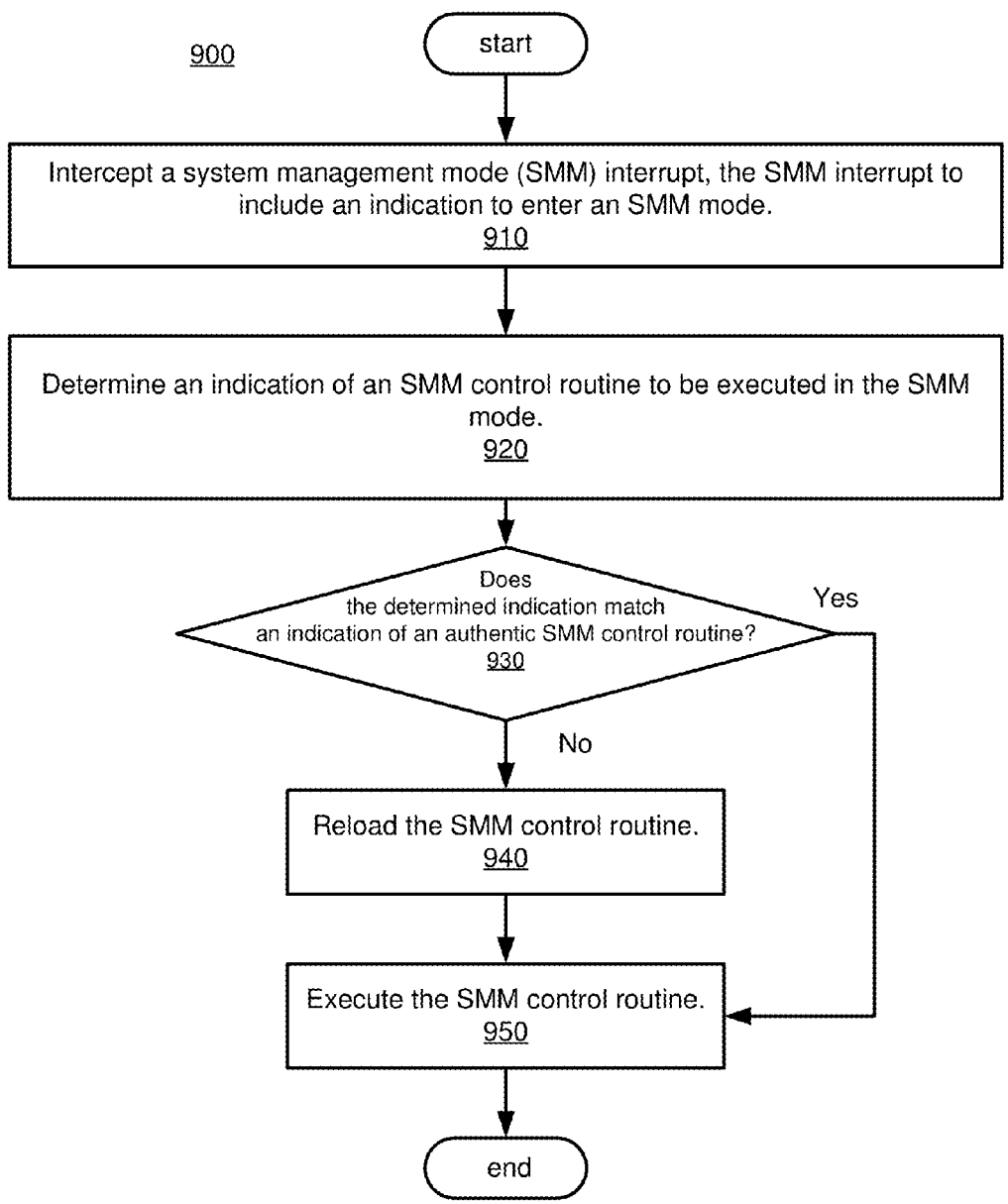
Figure 10:
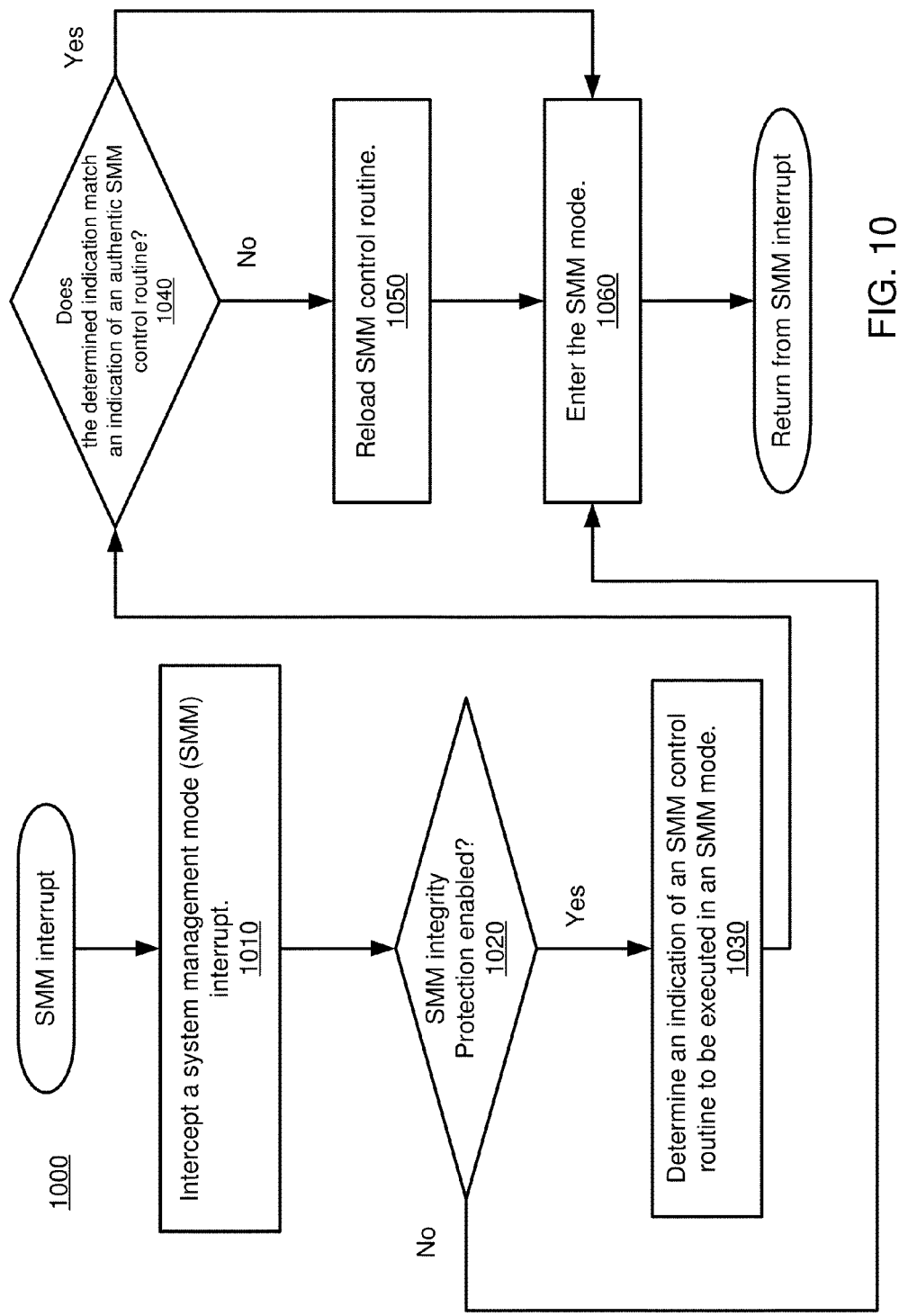

FIGS. 7-10 depict example logic flows that may be implemented by embodiments of the present disclosure. In particular, FIGS. 7-8 depict logic flows 700 and 800, respectively, which may be implemented to initialize SMM integrity protection as described herein; while FIGS. 9-10 depict logic flows 900 and 1000, respectively, that may be implemented to provide SMM integrity protection during operation as described herein. In some examples, the device 100 may implement the logic flows. For convenience and clarity, the logic flows 700-1000 are described with reference to the device 100 and FIGS. 1-4. However, examples are not limited in this context.

SMM Integrity Protection Initialization

Turning more specifically to FIG. 7, the logic flow 700 may begin at block 710. At block 710 "add an SMM control routine to a computer-readable storage location," the processing unit 110, in executing the BIOS 132 can copy the SMM control routine 134 from initialization storage 130 to computer-readable storage 120.

Continuing to block 720 "add an information element to include an indication of the SMM control routine to a secure register," the circuitry 142, in executing the TEE control routine 144 can generate the SMM authentication IE 148 to include an indication of the SMM control routine 134 and add the SMM authentication IE to a secure register, such as, for example, the TEE storage 140.

Turning more specifically to FIG. 8, the logic flow 800 may begin at block 810. "add an SMM control routine to a computer-readable storage location," the processing unit 110, in executing the BIOS 132 can copy the SMM control routine 134 from initialization storage 130 to computer-readable storage 120. Continuing to block 820 "enable or disable SMM integrity protection," the processing unit 110, in executing the BIOS 132 can generate the SMM IP IE 152 to include an indication of whether an SMM IP scheme is enabled or not and store the SMM IP IE 152 in the controlled register 150.

Continuing to decision block 830 "SMM integrity protection enabled?," the circuitry 142, in executing the TEE 140 can determine whether the SMM IP scheme is enabled or not based on the SMM IP IE 152. From decision block 830, the logic flow 800 can continue to either block 840 or block 860. In particular, the circuitry 142, in executing the TEE control routine 144 may continue from decision block 830 to block 840 based on a determination that the SMM IP scheme is enabled or to block 860 based on a determination that the SMM IP scheme is not enabled.

At block 840 "determine a hash of SMM control routine," the circuitry 142, in executing the TEE control routine 144 can determine a hash value corresponding to the SMM control routine 134. Continuing to block 850 "add SMM authentication information element to include an indication of the determined hash to a secure register," the circuitry 142, in executing the TEE control routine 144 can generate the SMM authentication IE 148 to include an indication of the determined hash of the SMM control routine 134 and add the SMM authentication IE to a secure register, such as, for example, the TEE storage 140. From block 850, the logic flow may continue to block 860.

At block 860 "continue BIOS execution" the circuitry 142, in executing the TEE 144 can return control of initialization of the device 100 to the BIOS 132.

SMM Integrity Protection Operation

Turning more specifically to FIG. 9, the logic flow 900 may begin at block 910. At block 910 "intercept a system management mode (SMM) interrupt, the SMM interrupt to include an indication to enter an SMM mode," the circuitry 142, in executing the TEE control routine 144 can intercept an SMMI, for example, an SMMI generated by the processing unit in executing the host control routine 122.

Continuing to block 920, "determine an indication of an SMM control routine to be executed in the SMM mode," the circuitry 142, in executing the TEE control routine 144 can determine an indication (e.g., hash value, or the like) of the SMM control routine to be executed in the SMM mode (e.g., the SMM control routine 134 in computer-readable storage 120, or the like).

Continuing to decision block 930 "does the determined indication match an indication of an authentic SMM control routine?," the circuitry 142, in executing the TEE control routine 144 can determine whether the determined indication of the SMM control routine 134 in the computer-readable storage 120 matches an indication of an authentic SMM control routine (e.g., the indication of the SMM control routine storage in TEE storage 146, or the like). From decision block 930, the logic flow 900 can continue to either block 940 or block 950. In particular, the circuitry 142, in executing the TEE control routine 144 may continue from decision block 930 to block 940 based on a determination that the indications match (e.g., the SMM control routine to be executed is authentic) or to block 950 based on a determination that the indications do not match (e.g., the SMM control routine to be executed is not authentic).

At block 940 "reload the SMM control routine," the circuitry 142, in executing the TEE control routine 144 can reload the SMM control routine 134. More specifically, the TEE control routine 144 can copy the SMM control routine 134 from initialization storage 130 to computer-readable storage 120.

At block 950 "execute the SMM control routine," the processing unit 110 can execute the SMM control routine 134 (e.g., the SMM control routine 134 in computer-readable storage 120, or the like).

Turning more specifically to FIG. 10, the logic flow 1000 may begin at block 1010. "intercept a system management mode (SMM) interrupt," the circuitry 142, in executing the TEE control routine 144 can intercept an SMM interrupt, such as, for example, an SMMI generated by the processing unit 110 in executing the host control routine 122.

Continuing to decision block 1020 "SMM integrity protection enabled?," the circuitry 142, in executing the TEE 140 can determine whether the SMM IP scheme is enabled or not based (e.g., based on the enable field 1521 of the SMM IP IE 152). From decision block 1020, the logic flow 1000 can continue to either block 1030 or to block 1060. In particular, the circuitry 142, in executing the TEE control routine 144 may continue from decision block 1020 to block 1030 based on a determination that the SMM IP scheme is enabled or to block 1060 based on a determination that the SMM IP scheme is not enabled.

At block 1030, "determine an indication of an SMM control routine to be executed in the SMM mode," the circuitry 142, in executing the TEE control routine 144 can determine an indication (e.g., hash value, or the like) of the SMM control routine to be executed in the SMM mode (e.g., the SMM control routine 134 in computer-readable storage 120, or the like). Continuing to decision block 1040 "does the determined indication match an indication of an authentic SMM control routine?," the circuitry 142, in executing the TEE control routine 144 can determine whether the determined indication of the SMM control routine 134 in the computer-readable storage 120 matches an indication of an authentic SMM control routine (e.g., the indication of the SMM control routine storage in TEE storage 146, or the like). From decision block 1040, the logic flow 1000 can continue to either block 1050 or block 1060. In particular, the circuitry 142, in executing the TEE control routine 144 may continue from decision block 1040 to block 1060 based on a determination that the indications match (e.g., the SMM control routine to be executed is authentic) or to block 1050 based on a determination that the indications do not match (e.g., the SMM control routine to be executed is not authentic).

At block 1050 "reload the SMM control routine," the circuitry 142, in executing the TEE control routine 144 can reload the SMM control routine 134. More specifically, the TEE control routine 144 can copy the SMM control routine 134 from initialization storage 130 to computer-readable storage 120.

At block 1060 "enter the SMM mode," the device 100 can enter the SMM mode to handle the SMMI. In particular, the processing unit 110 can execute the SMM control routine 134 (e.g., the SMM control routine 134 in computer-readable storage 120, or the like) to handle the SMMI.

Figure 11:
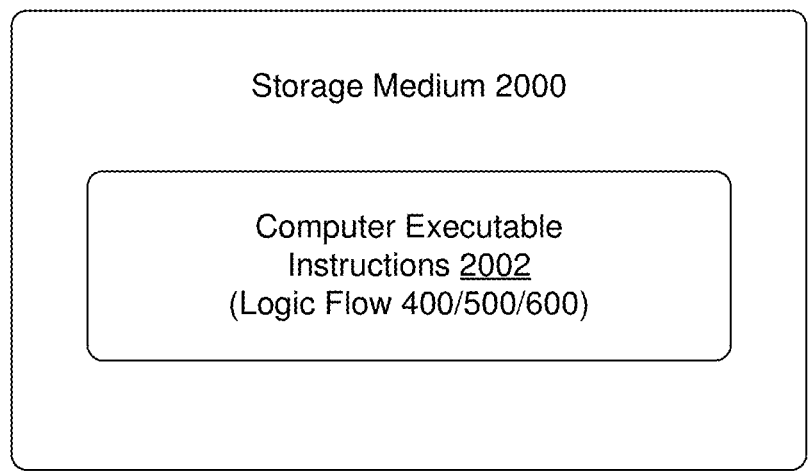
FIG. 11 illustrates a computer-readable storage medium according to an example.

FIG. 11 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 500. In some examples, the storage medium 2000 may store various types of computer executable instructions to implement technique 600. In some examples, the storage medium 2000 may store various types of computer executable instructions to implement logic flow 700. In some examples, the storage medium 2000 may store various types of computer executable instructions to implement logic flow 800. In some examples, the storage medium 2000 may store various types of computer executable instructions to implement logic flow 900. In some examples, the storage medium 2000 may store various types of computer executable instructions to implement logic flow 1000.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
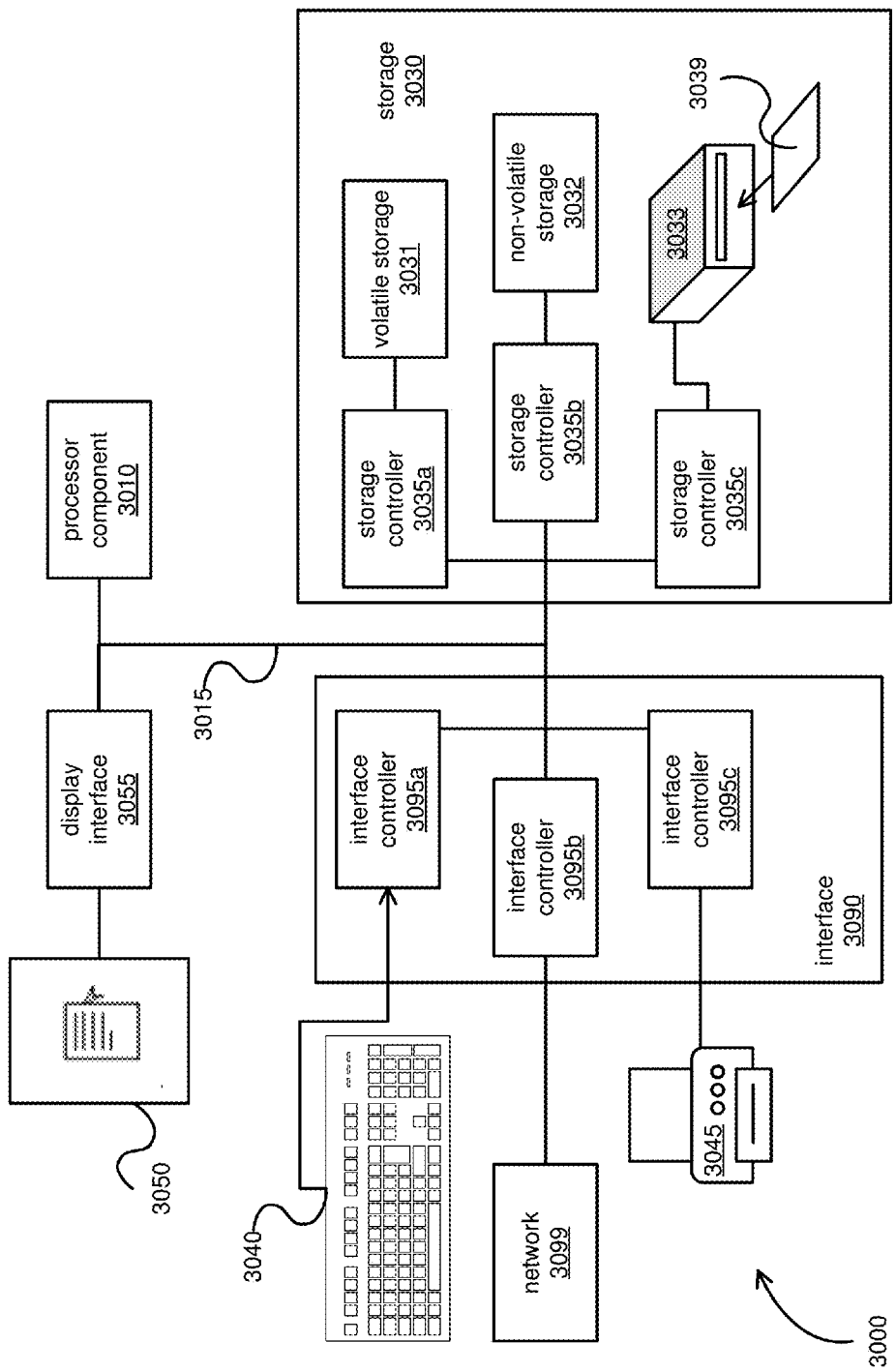
FIG. 12 illustrates an embodiment of a processing architecture.

FIG. 12 illustrates an embodiment of an exemplary processing architecture 3000 suitable for implementing various embodiments as previously described. More specifically, the processing architecture 3000 (or variants thereof) may be implemented as part of the device 100 of FIGS. 1-4.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, Serial ATA (SATA) and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic, phase change, or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935*a* providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c.

The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The description now turns to providing examples of the present disclosure. These examples are given to provide clarity to the disclosure, but are not intended to be limiting.

Example 1

An apparatus, comprising: logic, at least a portion of which is implemented in hardware, the logic to: determine an indication of a first copy of a system management mode (SMM) control routine; generate an information element to include the indication; and store the information element in a storage location accessible to the logic, wherein the storage location is a protected storage location accessible only to the logic.

Example 2

The apparatus of example 1, wherein the logic is implemented in a trusted execution environment.

Example 3

The apparatus of example 1, the logic to intercept an SMM interrupt and to determine the indication based on the intercepted SMM interrupt.

Example 4

The apparatus of example 1, wherein the indication of the first copy of the SMM control routine is a hash value of the first copy of the SMM control routine.

Example 5

The apparatus of example 1, the logic to determine whether an SMM integrity protection (IP) scheme is enabled and to determine the indication based on a determination that the SMM IP scheme is enabled.

Example 6

The apparatus of example 5, the logic to: access an SMM IP information element from a controlled register, the SMM IP information element to include an indication of whether the SMM IP scheme is enabled; and determine whether the SMM IP scheme is enabled based on the indication of whether the SMM IP scheme is enabled.

Example 7

The apparatus of example 6, comprising a processing unit operably coupled to the logic, the processing unit to execute an initialization control routine to: generate the first copy of the SMM control routine; generate the SMM IP information element to include an indication of whether the SMM IP scheme is enabled; and to store the SMM IP information element to the controlled register.

Example 8

The apparatus of example 7, wherein the initialization control routine is a basic input output system (BIOS) control routine.

Example 9

The apparatus of example 7, wherein the controlled register a register configured to be written once each time the apparatus is started.

Example 10

The apparatus of example 1, the logic to: intercept an SMM interrupt, the SMM interrupt to include an indication to enter an SMM mode, the SMM mode to include executing a second copy of the SMM control routine; determine an indication of the second copy of the SMM control routine; compare the indication of the first copy of the SMM control routine to the indication of the second copy of the SMM control routine; and determine whether the indication of the first copy of the SMM control routine matches the indication of the second copy of the SMM control routine.

Example 11

The apparatus of example 10, the logic to send a control signal to a processing unit operably coupled to the logic, the control signal to include an indication to enter the SMM mode based on a determination that the indication of the first copy of the SMM control routine matches the indication of the second copy of the SMM control routine.

Example 12

The apparatus of example 10, the logic to restore the second copy of the SMM control routine from a master copy of the SMM control routine based on a determination that the indication of the first copy of the SMM control routine does not match the indication of the second copy of the SMM control routine.

Example 13

The apparatus of example 12, comprising: a serial peripheral interface flash, the serial peripheral interface (SPI) flash comprising the master copy of the SMM control routine, the logic to copy the master copy of the SMM control routine from the SPI flash to a computer-readable memory location to be executed.

Example 14

The apparatus of example 10, the logic to send a control signal to a power management unit operably coupled to the logic, the control signal to include an indication to reboot the apparatus.

Example 15

A system comprising: a trusted execution environment (TEE), at least a portion of which is implemented in hardware, the trusted execution environment to: determine an indication of a first copy of a system management mode (SMM) control routine; generate an information element to include the indication; and store the information element in a storage location accessible to the TEE, wherein the storage location is a protected storage location accessible only to the TEE.

Example 16

The system of example 15, the TEE to intercept an SMM interrupt and to determine the indication based on the intercepted SMM interrupt.

Example 17

The system of example 15, wherein the indication of the first copy of the SMM control routine is a hash value of the first copy of the SMM control routine.

Example 18

The system of example 15, the TEE to determine whether an SMM integrity protection (IP) scheme is enabled and to determine the indication based on a determination that the SMM IP scheme is enabled.

Example 19

The system of example 18, comprising: a controlled register, the controlled register to include a system management mode (SMM) IP information element, the SMM IP information element to include an indication of whether an SMM IP scheme is enabled, the TEE to: access the SMM IP information element from the controlled register, the SMM IP information element to include an indication of whether the SMM IP scheme is enabled; and determine whether the SMM IP scheme is enabled based on the indication of whether the SMM IP scheme is enabled.

Example 20

The system of example 19, comprising a processing unit operably coupled to the TEE, the processing unit to execute an initialization control routine to: generate the first copy of the SMM control routine; generate the SMM IP information element to include an indication of whether the SMM IP scheme is enabled; and to store the SMM IP information element to the controlled register.

Example 21

The system of example 20, wherein the initialization control routine is a basic input output system (BIOS) control routine.

Example 22

The system of example 20, wherein the controlled register a register configured to be written once each time the system is started.

Example 23

The system of example 15, the TEE to: intercept an SMM interrupt, the SMM interrupt to include an indication to enter an SMM mode, the SMM mode to include executing a second copy of the SMM control routine; determine an indication of the second copy of the SMM control routine; compare the indication of the first copy of the SMM control routine to the indication of the second copy of the SMM control routine; and determine whether the indication of the first copy of the SMM control routine matches the indication of the second copy of the SMM control routine.

Example 24

The system of example 23, the TEE to send a control signal to a processing unit operably coupled to the TEE, the control signal to include an indication to enter the SMM mode based on a determination that the indication of the first copy of the SMM control routine matches the indication of the second copy of the SMM control routine.

Example 25

The system of example 23, the TEE to restore the second copy of the SMM control routine from a master copy of the SMM control routine based on a determination that the indication of the first copy of the SMM control routine does not match the indication of the second copy of the SMM control routine.

Example 26

The system of example 25, comprising: a serial peripheral interface flash, the serial peripheral interface (SPI) flash comprising the master copy of the SMM control routine, the TEE to copy the master copy of the SMM control routine from the SPI flash to a computer-readable memory location to be executed.

Example 27

The system of example 23, the TEE to send a control signal to a power management unit operably coupled to the TEE, the control signal to include an indication to reboot the apparatus.

Example 28

At least one machine-readable storage medium comprising instructions that when executed by a trusted execution environment (TEE) of a device, cause the TEE to: determine an indication of a first copy of a system management mode (SMM) control routine; generate an information element to include the indication; and store the information element in a storage location accessible to the TEE, wherein the storage location is a protected storage location accessible only to the TEE.

Example 29

The at least one machine-readable storage medium of example 28, comprising instructions that cause the TEE to intercept an SMM interrupt and to determine the indication based on the intercepted SMM interrupt.

Example 30

The at least one machine-readable storage medium of example 28, wherein the indication of the first copy of the SMM control routine is a hash value of the first copy of the SMM control routine.

Example 31

The at least one machine-readable storage medium of example 28, comprising instructions that cause the TEE to determine whether an SMM integrity protection (IP) scheme is enabled and to determine the indication based on a determination that the SMM IP scheme is enabled.

Example 32

The at least one machine-readable storage medium of example 31, comprising instructions that cause the TEE to: access an SMM IP information element from a controlled register, the SMM IP information element to include an indication of whether the SMM IP scheme is enabled; and determine whether the SMM IP scheme is enabled based on the indication of whether the SMM IP scheme is enabled.

Example 33

The at least one machine-readable storage medium of example 32, comprising a processing unit operably coupled to the TEE, the processing unit to execute an initialization control routine to: generate the first copy of the SMM control routine; generate the SMM IP information element to include an indication of whether the SMM IP scheme is enabled; and to store the SMM IP information element to the controlled register.

Example 34

The at least one machine-readable storage medium of example 33, wherein the initialization control routine is a basic input output system (BIOS) control routine.

Example 35

The at least one machine-readable storage medium of example 33, wherein the controlled register a register configured to be written once each time the apparatus is started.

Example 36

The at least one machine-readable storage medium of example 28, comprising instructions that cause the TEE to: intercept an SMM interrupt, the SMM interrupt to include an indication to enter an SMM mode, the SMM mode to include executing a second copy of the SMM control routine; determine an indication of the second copy of the SMM control routine; compare the indication of the first copy of the SMM control routine to the indication of the second copy of the SMM control routine; and determine whether the indication of the first copy of the SMM control routine matches the indication of the second copy of the SMM control routine.

Example 37

The at least one machine-readable storage medium of example 36, comprising instructions that cause the TEE to send a control signal to a processing unit operably coupled to the TEE, the control signal to include an indication to enter the SMM mode based on a determination that the indication of the first copy of the SMM control routine matches the indication of the second copy of the SMM control routine.

Example 38

The at least one machine-readable storage medium of example 36, comprising instructions that cause the TEE to restore the second copy of the SMM control routine from a master copy of the SMM control routine based on a determination that the indication of the first copy of the SMM control routine does not match the indication of the second copy of the SMM control routine.

Example 39

The at least one machine-readable storage medium of example 38, comprising: a serial peripheral interface flash, the serial peripheral interface (SPI) flash comprising the master copy of the SMM control routine, the medium comprising instructions that cause the TEE to copy the master copy of the SMM control routine from the SPI flash to a computer-readable memory location to be executed.

Example 40

The at least one machine-readable storage medium of example 36, comprising instructions that cause the TEE to send a control signal to a power management unit operably coupled to the TEE, the control signal to include an indication to reboot the TEE.

Example 41

A computer-implemented method comprising: determining an indication of a first copy of a system management mode (SMM) control routine; generating, within a trusted execution environment (TEE), an information element to include the indication; and storing the information element in a storage location accessible to the TEE, wherein the storage location is a protected storage location accessible only to the TEE.

Example 42

The computer-implemented method of example 41, comprising: intercepting an SMM interrupt; and determining the indication based on the intercepted SMM interrupt.

Example 43

The computer-implemented method of example 41, wherein the indication of the first copy of the SMM control routine is a hash value of the first copy of the SMM control routine.

Example 44

The computer-implemented method of example 41, comprising: determining whether an SMM integrity protection (IP) scheme is enabled; and determining the indication based on a determination that the SMM IP scheme is enabled.

Example 45

The computer-implemented method of example 44, comprising: accessing an SMM IP information element from a controlled register, the SMM IP information element to include an indication of whether the SMM IP scheme is enabled; and determining whether the SMM IP scheme is enabled based on the indication of whether the SMM IP scheme is enabled.

Example 46

The computer-implemented method of example 45, comprising: generating the first copy of the SMM control routine; generating the SMM IP information element to include an indication of whether the SMM IP scheme is enabled; and storing the SMM IP information element to the controlled register.

Example 47

The computer-implemented method of example 46, wherein the controlled register a register configured to be written once each time the apparatus is started.

Example 48

The computer-implemented method of example 41, comprising: intercepting an SMM interrupt, the SMM interrupt to include an indication to enter an SMM mode, the SMM mode to include executing a second copy of the SMM control routine; determining an indication of the second copy of the SMM control routine; comparing the indication of the first copy of the SMM control routine to the indication of the second copy of the SMM control routine; and determining whether the indication of the first copy of the SMM control routine matches the indication of the second copy of the SMM control routine.

Example 49

The computer-implemented method of example 48, comprising sending a control signal to a processing unit, the control signal to include an indication to enter the SMM mode based on a determination that the indication of the first copy of the SMM control routine matches the indication of the second copy of the SMM control routine.

Example 50

The computer-implemented method of example 48, comprising restoring the second copy of the SMM control routine from a master copy of the SMM control routine based on a determination that the indication of the first copy of the SMM control routine does not match the indication of the second copy of the SMM control routine.

Example 51

The computer-implemented method of example 50, comprising coping the master copy of the SMM control routine from a serial peripheral interconnect (SPI) flash to a computer-readable memory location to be executed.

Example 52

The computer-implemented method of example 48, comprising sending a control signal to a power management unit, the control signal to include an indication to reboot the computer.

Example 53

An apparatus for a device, the apparatus comprising means for performing the method of any one of examples 41 to 52.

The invention claimed is:
1. An apparatus, comprising: logic, at least a portion of which is implemented in hardware, the logic to:
  generate a size indication, the size indication to indicate a size of a first copy of a system management mode (SMM) control routine;
  store the size indication in a register;
  determine an indication of the SMM control routine;
  generate an information element to include the indication; and
  store the information element in a storage location accessible to the logic, wherein the logic is implemented in a trusted execution environment and wherein the storage location is a protected storage location accessible only to the logic.
2. The apparatus of claim 1, the logic to intercept an SMM interrupt and to determine the indication based on the intercepted SMM interrupt.
3. The apparatus of claim 1, wherein the indication of the first copy of the SMM control routine is a hash value of the first copy of the SMM control routine.
4. The apparatus of claim 1, the logic to determine whether an SMM integrity protection (IP) scheme is enabled and to determine the indication based on a determination that the SMM IP scheme is enabled.
5. The apparatus of claim 4, the logic to:
  access an SMM IP information element from a controlled register, the SMM IP information element to include an indication of whether the SMM IP scheme is enabled; and
  determine whether the SMM IP scheme is enabled based on the indication of whether the SMM IP scheme is enabled, wherein the controlled register a register configured to be written once each time the apparatus is started.

6. The apparatus of claim 5, comprising a processing unit operably coupled to the logic, the processing unit to execute an initialization control routine to:
generate the first copy of the SMM control routine;
generate the SMM IP information element to include an indication of whether the SMM IP scheme is enabled; and
to store the SMM IP information element to the controlled register.

7. The apparatus of claim 1, the logic to:
intercept an SMM interrupt, the SMM interrupt to include an indication to enter an SMM mode, the SMM mode to include executing a second copy of the SMM control routine;
determine an indication of the second copy of the SMM control routine;
compare the indication of the first copy of the SMM control routine to the indication of the second copy of the SMM control routine; and
determine whether the indication of the first copy of the SMM control routine matches the indication of the second copy of the SMM control routine.

8. The apparatus of claim 7, the logic to send a control signal to a processing unit operably coupled to the logic, the control signal to include an indication to enter the SMM mode based on a determination that the indication of the first copy of the SMM control routine matches the indication of the second copy of the SMM control routine.

9. The apparatus of claim 7, the logic to restore the second copy of the SMM control routine from a master copy of the SMM control routine based on a determination that the indication of the first copy of the SMM control routine does not match the indication of the second copy of the SMM control routine.

10. A system comprising:
a trusted execution environment (TEE), at least a portion of which is implemented in hardware, the trusted execution environment to:
access a register comprising an enable field and a size indication field, the size indication field to indicate a size of a first copy of a system management mode (SMM) control routine;
determine an indication of the first copy of the SMM control routine based on the register;
generate an information element to include the indication; and
store the information element in a storage location accessible to the TEE, wherein the storage location is a protected storage location accessible only to the TEE.

11. The system of claim 10, the TEE to intercept an SMM interrupt and to determine the indication based on the intercepted SMM interrupt.

12. The system of claim 10, wherein the indication of the first copy of the SMM control routine is a hash value of the first copy of the SMM control routine.

13. The system of claim 10, the TEE to determine whether an SMM integrity protection (IP) scheme is enabled and to determine the indication based on a determination that the SMM IP scheme is enabled.

14. The system of claim 10, comprising:
the register to include an SMM integrity protection (IP) information element comprising the enable field, the SMM IP information element to include an indication of whether an SMM IP scheme is enabled, the TEE to:
access the SMM IP information element from the register; and
determine whether the SMM IP scheme is enabled based on the SMM IP information element.

15. The system of claim 10, the TEE to:
intercept an SMM interrupt, the SMM interrupt to include an indication to enter an SMM mode, the SMM mode to include executing a second copy of the SMM control routine;
determine an indication of the second copy of the SMM control routine;
compare the indication of the first copy of the SMM control routine to the indication of the second copy of the SMM control routine; and
determine whether the indication of the first copy of the SMM control routine matches the indication of the second copy of the SMM control routine.

16. The system of claim 15, the TEE to send a control signal to a processing unit operably coupled to the TEE, the control signal to include an indication to enter the SMM mode based on a determination that the indication of the first copy of the SMM control routine matches the indication of the second copy of the SMM control routine.

17. The system of claim 15, the TEE to restore the second copy of the SMM control routine from a master copy of the SMM control routine based on a determination that the indication of the first copy of the SMM control routine does not match the indication of the second copy of the SMM control routine.

18. At least one non-transitory machine-readable storage medium comprising instructions that when executed by a trusted execution environment (TEE) of a device, cause the TEE to:
determine an indication of a first copy of a system management mode (SMM) control routine based on a register comprising an enable field and a size indication field, the size indication field to indicate a size of the first SMM control routine;
generate an information element to include the indication; and
store the information element in a storage location accessible to the TEE, wherein the storage location is a protected storage location accessible only to the TEE.

19. The at least one non-transitory machine-readable storage medium of claim 18, wherein the indication of the first copy of the SMM control routine is a hash value of the first copy of the SMM control routine.

20. The at least one non-transitory machine-readable storage medium of claim 18, comprising instructions that cause the TEE to:
intercept an SMM interrupt, the SMM interrupt to include an indication to enter an SMM mode, the SMM mode to include executing a second copy of the SMM control routine;
determine an indication of the second copy of the SMM control routine;
compare the indication of the first copy of the SMM control routine to the indication of the second copy of the SMM control routine; and
determine whether the indication of the first copy of the SMM control routine matches the indication of the second copy of the SMM control routine.

21. The at least one non-transitory machine-readable storage medium of claim 20, comprising instructions that cause the TEE to send a control signal to a processing unit operably coupled to the TEE, the control signal to include an indication to enter the SMM mode based on a determination that the indication of the first copy of the SMM control routine matches the indication of the second copy of the SMM control routine.

22. The at least one non-transitory machine-readable storage medium of claim 20, comprising instructions that cause the TEE to restore the second copy of the SMM control routine from a master copy of the SMM control routine based on a determination that the indication of the first copy of the SMM control routine does not match the indication of the second copy of the SMM control routine.

23. A computer-implemented method comprising:
generating a size indication, the size indication to indicate a size of a first copy of a system management mode (SMM) control routine;
storing the size indication in a register;
determining an indication of the SMM control routine;
generating, within a trusted execution environment (TEE), an information element to include the indication; and
storing the information element in a storage location accessible to the TEE, wherein the storage location is a protected storage location accessible only to the TEE.

24. The computer-implemented method of claim 23, wherein the indication of the first copy of the SMM control routine is a hash value of the first copy of the SMM control routine.

25. The computer-implemented method of claim 23, comprising:
intercepting an SMM interrupt, the SMM interrupt to include an indication to enter an SMM mode, the SMM mode to include executing a second copy of the SMM control routine;
determining an indication of the second copy of the SMM control routine;
comparing the indication of the first copy of the SMM control routine to the indication of the second copy of the SMM control routine; and
determining whether the indication of the first copy of the SMM control routine matches the indication of the second copy of the SMM control routine.

26. The computer-implemented method of claim 25, comprising at least one of:
sending a control signal to a processing unit, the control signal to include an indication to enter the SMM mode based on a determination that the indication of the first copy of the SMM control routine matches the indication of the second copy of the SMM control routine; or
restoring the second copy of the SMM control routine from a master copy of the SMM control routine based on a determination that the indication of the first copy of the SMM control routine does not match the indication of the second copy of the SMM control routine.

\* \* \* \* \*